United States Patent

Brown et al.

(10) Patent No.: US 7,149,905 B2
(45) Date of Patent: Dec. 12, 2006

(54) FIRMWARE CONTROLLED DYNAMIC VOLTAGE ADJUSTMENT

(75) Inventors: Martha A. Brown, Stewartville, MN (US); Todd J. Rosedah, Zumbrota, MN (US); John N. Tietjen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 10/444,011

(22) Filed: May 22, 2003

(65) Prior Publication Data

US 2004/0236972 A1 Nov. 25, 2004

(51) Int. Cl.
*G06F 1/26* (2006.01)
(52) U.S. Cl. .................................................... 713/300
(58) Field of Classification Search ................ 713/300
See application file for complete search history.

(56) References Cited

U.S. PATENT DOCUMENTS

| | | | | |
|---|---|---|---|---|
| 5,440,520 A | * | 8/1995 | Schutz et al. ................ | 365/226 |
| 5,632,039 A | * | 5/1997 | Walker et al. ............... | 713/300 |
| 5,764,529 A | * | 6/1998 | Capps et al. .................. | 716/1 |
| 5,935,252 A | * | 8/1999 | Berglund et al. ............ | 713/300 |
| 6,119,241 A | * | 9/2000 | Michail et al. .............. | 713/322 |
| 6,691,235 B1 | * | 2/2004 | Garcia et al. ................ | 713/300 |
| 6,697,952 B1 | * | 2/2004 | King .......................... | 713/300 |
| 6,732,266 B1 | * | 5/2004 | Anderson et al. ........... | 713/100 |
| 6,772,356 B1 | * | 8/2004 | Qureshi et al. .............. | 713/321 |
| 6,791,157 B1 | * | 9/2004 | Casto et al. ................. | 257/529 |
| 6,836,848 B1 | * | 12/2004 | Yu et al. ...................... | 713/300 |
| 6,874,083 B1 | * | 3/2005 | Sarangi et al. .............. | 713/100 |
| 6,880,076 B1 | * | 4/2005 | Greiner et al. ................. | 713/1 |
| 6,988,211 B1 | * | 1/2006 | Cline et al. ................. | 713/300 |
| 2004/0054936 A1 | * | 3/2004 | Dwyer et al. ................ | 713/300 |

* cited by examiner

*Primary Examiner*—Chun Cao
(74) *Attorney, Agent, or Firm*—Patterson & Sheridan LLP

(57) ABSTRACT

Methods, apparatus, articles of manufacture, and systems for providing a supply voltage to an electronic component, such as a processor, are provided. An executable software component, such as system firmware, may access a voltage selection value embedded in the component and retrieve a voltage setting, from a table of voltage settings, using the embedded voltage selection value as an index. The software component may then configure a power supply, based on the voltage setting retrieved from the voltage selection table, to supply the component with an optimal supply voltage. For some embodiments, the voltage selection table may be replaced by downloading a new voltage selection table, thus, allowing changes to the component supply voltage without changing hardware.

4 Claims, 4 Drawing Sheets

FIRMWARE CONTROLLED DYNAMIC VOLTAGE ADJUSTMENT

BACKGROUND OF THE INVENTION

1. Field of the Invention

The present invention generally relates to computer systems and more particularly to the adjustment of voltages supplied to processors in computer systems.

2. Description of the Related Art

Some electronic components, such as processors used in computer systems, run optimally at a specific supply voltage (i.e., the voltage supplied to the component by a power supply). Determining this optimal supply voltage may require extensive testing, which may not be performed until a final design version of the component is completed. In fact, with the increased pressures to speed component time to market, this testing may not be performed until after a product is released. As a result, for some components, the optimal supply voltage not be known until the component has already been built in quantity or already in use in the field (e.g., a customer site, or a production environment). Therefore, one problem component manufacturers (as well as manufacturers of systems utilizing the components) are presented with is how to change supply voltage, or at least allow for changes to supply voltage, in the field to optimize component performance.

One solution to this problem is to release new power supplies or power supply components to provide a newly determined optimal supply voltage. However, developing new power supplies and regulators and replacing old ones is an expensive proposition. Further, customers may not be willing to endure the down time necessary to replace the power supplies or components, particularly, if the system is vital to the operations of their business, such as an enterprise server.

Accordingly, there is a need for an improved method for changing the voltage supplied to an electronic component in the field, preferably that does not require hardware changes, such as a new power supply or power supply components.

SUMMARY OF THE INVENTION

The present invention generally is directed to improved methods, apparatus, articles of manufacture, and systems for allowing changes to supply voltages for a component.

One embodiment provides a method for providing a supply voltage to an electronic component. The method generally includes reading a voltage selection value of the electronic component and setting a voltage level of a supply voltage provided to the electronic component based on the voltage selection value.

Another embodiment provides a method for determining a supply voltage to provide a processor. The method generally includes determining an initial supply voltage for the processor and setting a voltage selection value of the processor to point to an entry in a voltage selection table, the entry containing a value that may be used to configure a power supply to provide the initial supply voltage to the processor.

Another embodiment provides a computer readable medium containing a program for setting a supply voltage provided to a processor by a power supply. When executed, the program performs operations generally including reading a voltage selection value embedded in the processor and setting a voltage level of the supply voltage provided to the processor by the power supply based on the voltage selection value.

Another embodiment provides a processor having an embedded voltage selection value, accessible by an external device, for use in establishing a supply voltage to be provided to the processor.

Another embodiment provides a system generally including at least one processor having a voltage selection value embedded therein, a power supply adapted to provide a supply voltage to the processor and a system power control component. The system power control component is generally configured to read the voltage selection value embedded in the processor and set a voltage level of the supply voltage based on the voltage selection value.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to methods, articles of manufacture and systems for adjusting the voltage supplied to an electronic component. An executable software component, such as system firmware, may access a voltage selection value embedded in the component and retrieve an optimal voltage setting, from a table of voltage settings, using the embedded voltage selection value as an index. The software component may then configure a power supply, based on the retrieved optimal voltage setting, to supply the component with the optimal supply voltage. For some embodiments, the table of voltage settings may be replaced by downloading a new table, thus, allowing the supply voltage to the component to be changed without changing hardware.

As used herein, the term firmware generally refers to specialized software that typically includes low level machine readable code (i.e., microcode) used to provide an interface to various hardware components while isolating higher level software (i.e., an operating system or application running thereon) from the details of that hardware access. While the description below will describe aspects of the present invention as embodied as firmware, it should be understood that firmware is an example of just one embodiment and the same or similar aspects may be embodied as higher level software, as well as specialized hardware configured to perform the same or similar operations. Further, while aspects of the present invention may be utilized to adjust the supply voltage to virtually any type of electronic component, to facilitate understanding, the description below will refer to adjusting the supply voltage to a processor as a specific, but not limiting, application example.

Exemplary Application Environment

Figure 1:
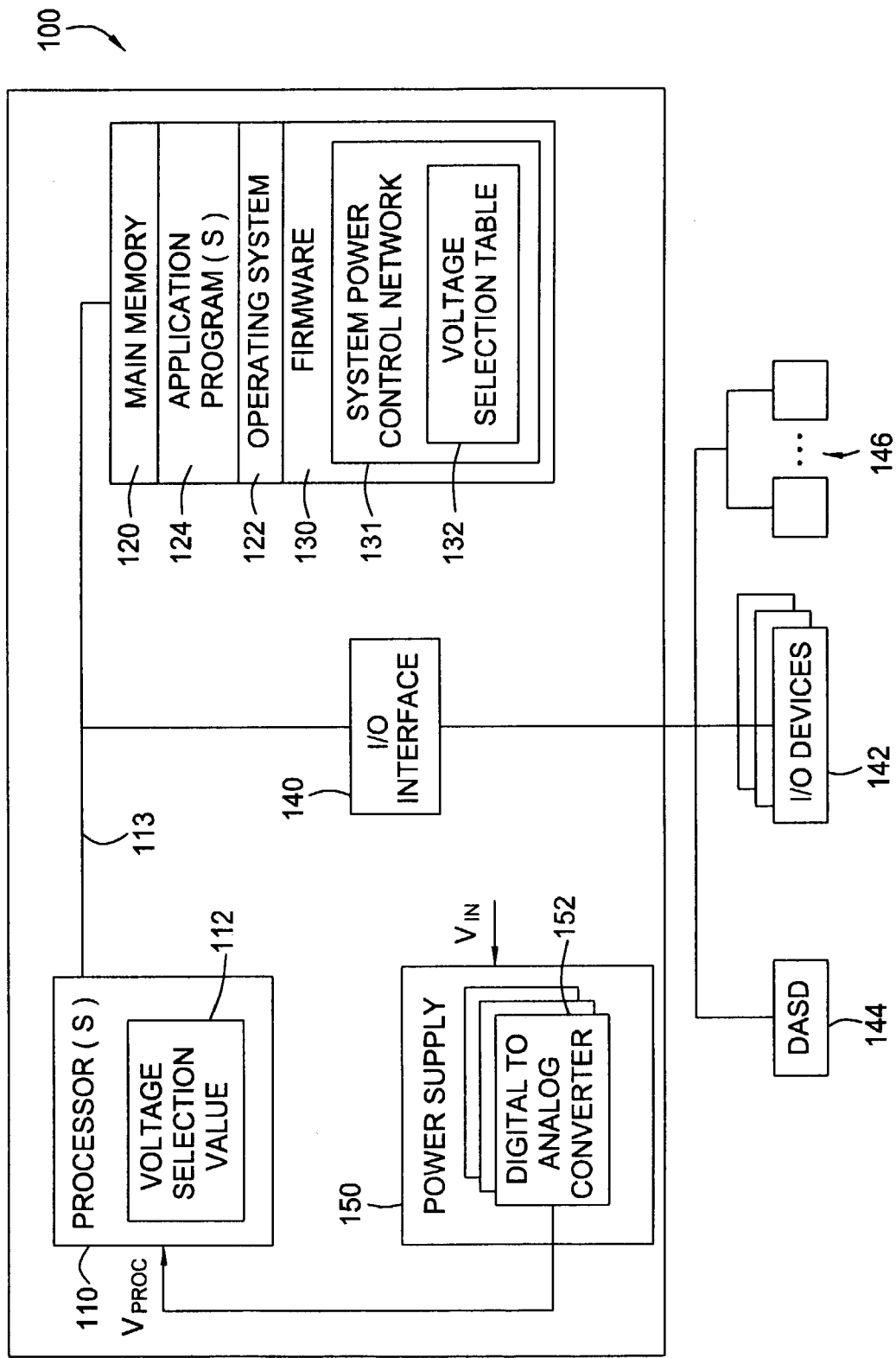
FIG. 1 is an exemplary computer system illustratively utilized in accordance with the present invention.

FIG. 1 shows an exemplary computer system 100, in which embodiments of the present invention may be utilized. For example, embodiments of the present invention may be implemented as a program product, such as a system power control network (SPCN) component 131 and voltage selection table 132 of firmware 130 for use with the system 100, to adjust a voltage supplied by a power supply 150 to a processor 110 or other type electronic component. The program(s) of the program product defines functions of the embodiments (including the methods described herein) and can be contained on a variety of signal-bearing media.

Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention (such as the SPCN 131). However, it should be appreciated that any particular nomenclature that follows is used merely for convenience, and thus the invention should not be limited to use solely in any specific application identified and/or implied by such nomenclature.

The computer system 100 shown in FIG. 1 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 100 is an eServer iSeries computer system available from International Business Machines (IBM) of Armonk, N.Y.

As illustrated, the computer system 100 generally includes one or more processors 110. For some embodiments, the processors 110 may include a system processor (not shown) that may serve as an interface to an external device used to manage the system 100, such as IBM's hardware management console (HMC), allowing, among other things, for the download of updates to the firmware 130. Each processor 110 may be connected via a bus 113 to a memory 120, and any number of hardware components, including, but not limited to, an I/O interface 140. The I/O interface 140 generally represents any combination of interface components for communication with a variety of devices including storage devices, such as a direct access storage devices (DASD) 142, various I/O devices 142, and various networked devices 146, such as networked storage devices, networked printers, and other networked computers (e.g., workstations).

The memory 120 may be any suitable type system memory, such as a random access memory (RAM) sufficiently large to hold the necessary programming and data structures of the invention. While the memory 120 is shown as a single entity, it should be understood that the memory 120 may in fact comprise a plurality of modules, and that the memory 120 may exist at multiple levels, from high speed registers and caches to lower speed but larger DRAM chips.

Illustratively, the memory 120 contains an operating system 122 with one or more application programs 124 running thereon. The operating system 122 may represent any suitable operating system, such as IBM's OS/400, IBM's AIX, Linux, and the like. For some embodiments, the computer system 100 may be logically partitioned with each partition running its own operating system. In such an embodiment, system resources, such as the processors 110 and memory 120 may be allocated among the logical partitions using well known logical partitioning schemes.

As shown, the memory 120 may also include firmware code 130 which may be generally configured to serve as an interface for the operating system 122 to access hardware components, while hiding the details of such access from the operating system 122. An objective of the firmware code 130 may be to configure various hardware components of the computer system 100, during what is generally referred to as a boot process, in preparation of running the operating system 122. As part of the boot process, for example, a system power control network (SPCN) component 131 of the firmware code 130 may configure various digital to analog converters (DACs) 152 of the power supply 150, each of which may provide a supply voltage to a different one or more of the various hardware components of the computer system 100.

Firmware Control of Processor Voltage

Figure 2:
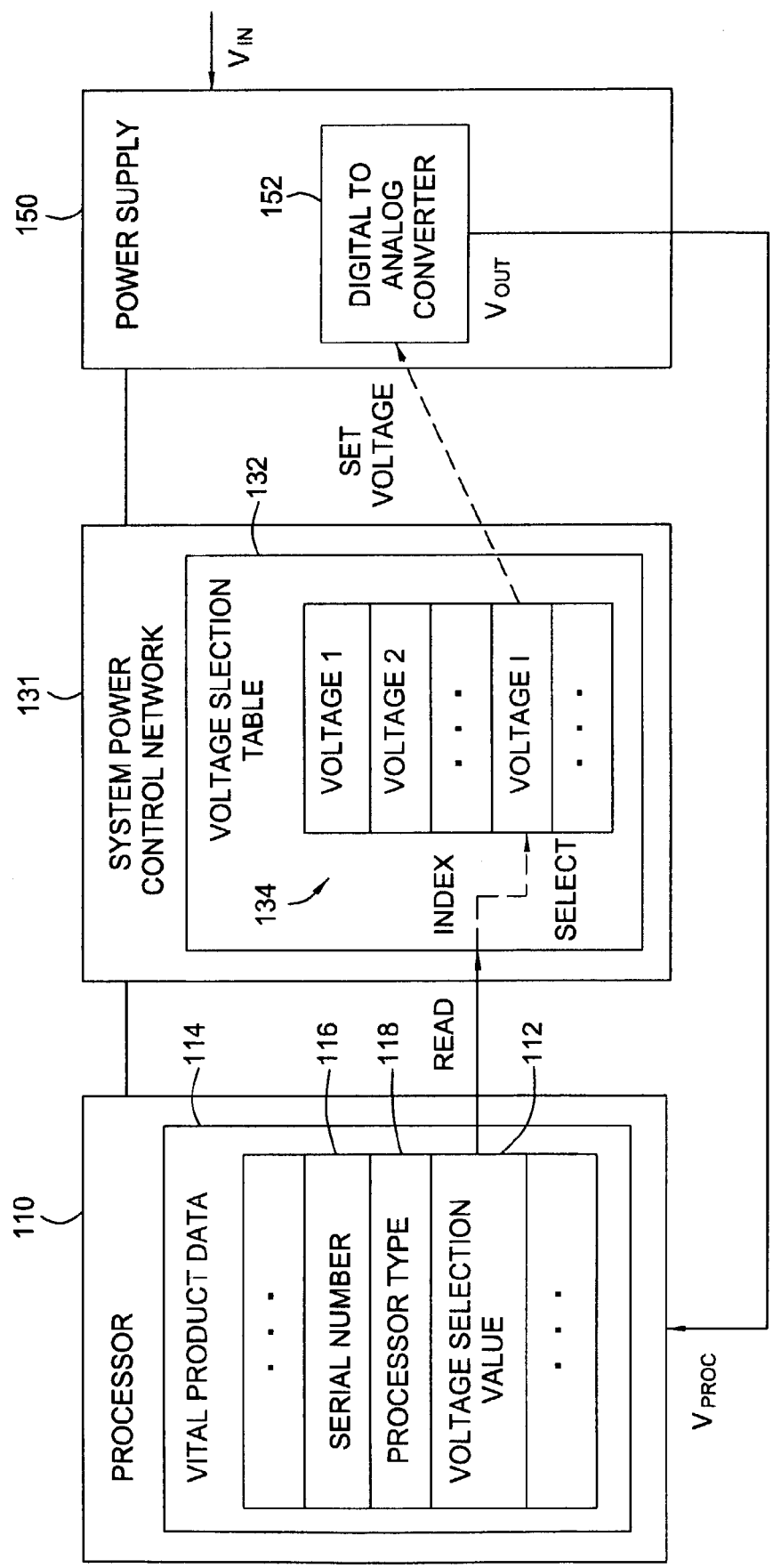
FIG. 2 is a relational view of components utilized in accordance with an embodiment of the present invention.

For some embodiments, processors 110 may be provided with an embedded voltage selection value (VSV) 112 that may be used to indicate an optimum supply voltage for the processor. The VSV 112 may be set at manufacturing time. Referring now to FIG. 2, for some embodiments, the VSV 112 for a processor 110 may be included as part of a set of embedded data bits commonly referred to as vital product data (VPD) 114. VPD bits generally includes information about a component (e.g., a model number, a unique serial number, product release level, etc.). In fact, for some embodiments, rather than include a distinct embedded VSV 112, a model number or serial number (e.g., included as VPD) may be used as, or used to derive, a VSV for a processor 110.

Regardless, the SPCN 131 may be configured to set an output voltage of one of the DACs 152 of the power supply 150 to provide an optimum supply voltage to a processor 110, based on its VSV 112. For example, the VSV 112 may contain a value indicative of the optimal supply voltage for the processor 110, such as a voltage value or a setting (e.g., a digital value that determines the output voltage) for a DAC 152 that results in the DAC 152 outputting the optimal supply voltage.

By varying supply voltage based on the VSV 112, a single power supply 150 may be able to supply a number of different supply voltages (i.e., different VSVs may result in different supply voltages), limited only by the resolution of the DACs 152. Thus, one approach to change a supply voltage to a processor 110 without changing power supply components is to change the VSV 112. However, changes to the VSV 112 typically require a hardware change to the processor 110 which may be relatively expensive and may undesirably result in additional revisions of processor 110. Therefore, for some embodiments, in an effort to avoid hardware changes to the processor 110, the VSV 112 may be stored in a portion of updatable memory in the processor 110, such as electrically erasable programmable read only memory (EEPROM). As an alternative, an updatable voltage selection table 132 may be utilized to change a processor supply voltage.

For example, the VSV 112 may contain a index or "pointer value" that indicates a location of an optimum voltage setting from the voltage selection table 132. As illustrated in FIG. 2, the voltage selection table 132 may include several voltage setting entries 134, which may contain, for example, voltage values or binary values corresponding to settings of the DAC 152 that result in an output ($V_{PROC}$) of the optimum supply voltage. Each entry 134 may correspond to a different VSV 112 (e.g., a VSV of 0 may select the first entry 134, a VSV of 1 may select the second entry 134, and so on). For some embodiments, the VSV 112 of each unique version of a processor 110 may be set to a different value, essentially assigning a different entry 134 of the voltage selection table 132 to each unique processor. For such embodiments, the supply voltage for a processor 110 may be changed by downloading a new voltage selection table 132 containing a new optimum supply voltage setting in the entry 134 assigned to that processor 110, thus eliminating the need for a hardware revision to the processor 110.

Figure 3:
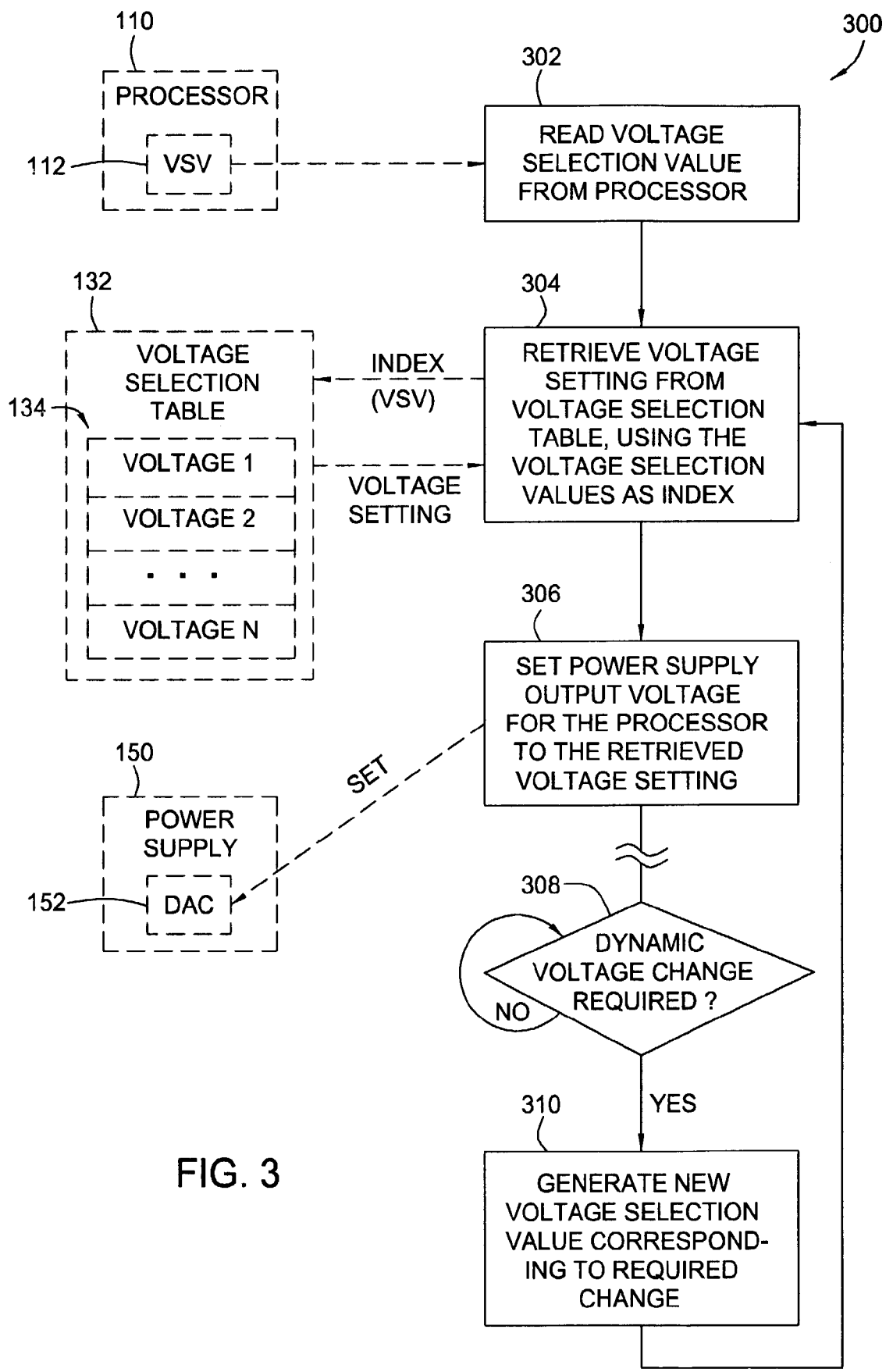
FIG. 3 is a flow chart illustrating exemplary operations for adjusting a supply voltage to a component in accordance with an embodiment of the present invention.

Operation of the various components illustrated in FIG. 2, that allow for changes in supply voltage without changes to the VSV 112, may best be described with simultaneous reference to FIG. 3 which illustrates exemplary operation 300 that may be performed, for example, by the SPCN 131. However, it should be understood that the various components illustrated in FIG. 2 are illustrative only and various other components may also be configured and utilized to perform the operations 300. Further, the exemplary components illustrated in FIG. 2 are not limited to performing the operations 300 and may perform other operations.

The operations 300 begin at step 302, by reading the VSV 112 from the processor 110. At step 304, a voltage setting (from an entry 134) from the voltage selection table 132 is retrieved, using the VSV 112 as an index. As previously described, the VSV 112 may indicate which of the voltage setting entries 134 corresponds to an optimum voltage setting for the processor 110. At step 306, the output voltage from the power supply 150 for the processor 110 is set using the voltage setting retrieved from the voltage selection table 132. For example, the SPCN 131 may write the voltage setting retrieved to the DAC 152 dedicated to provide the supply voltage to the processor 110.

In some cases, it may be desirable to change the supply voltage to the processor 110 at a later time (i.e., "dynamically") without rebooting. For example, a customer may wish to operate a processor 110 at a higher frequency to increase performance by "overclocking" or at a lower frequency to reduce power consumption (e.g., in a mobile application), either of which may mandate a different supply voltage. Regardless of the reason, at step 308, a determination is made as to whether a dynamic voltage change is required (or desired). If so, at step 310, a new VSV is generated corresponding to the required voltage change.

Processing may then return to step 304 to retrieve a voltage setting from the voltage selection table 132 using the generated VSV as an index (thus overriding the VSV 112 embedded in the processor 110) and, at step 306, the power supply 150 may be set to provide the new supply voltage to the processor 110. Of course, as an alternative, rather than generate a new VSV, at step 310, a new DAC setting corresponding to the required voltage change may be generated directly and processing may return to step 306 to set the power supply with the newly generated DAC setting.

Voltage Selection Value Assignment

Figure 4:
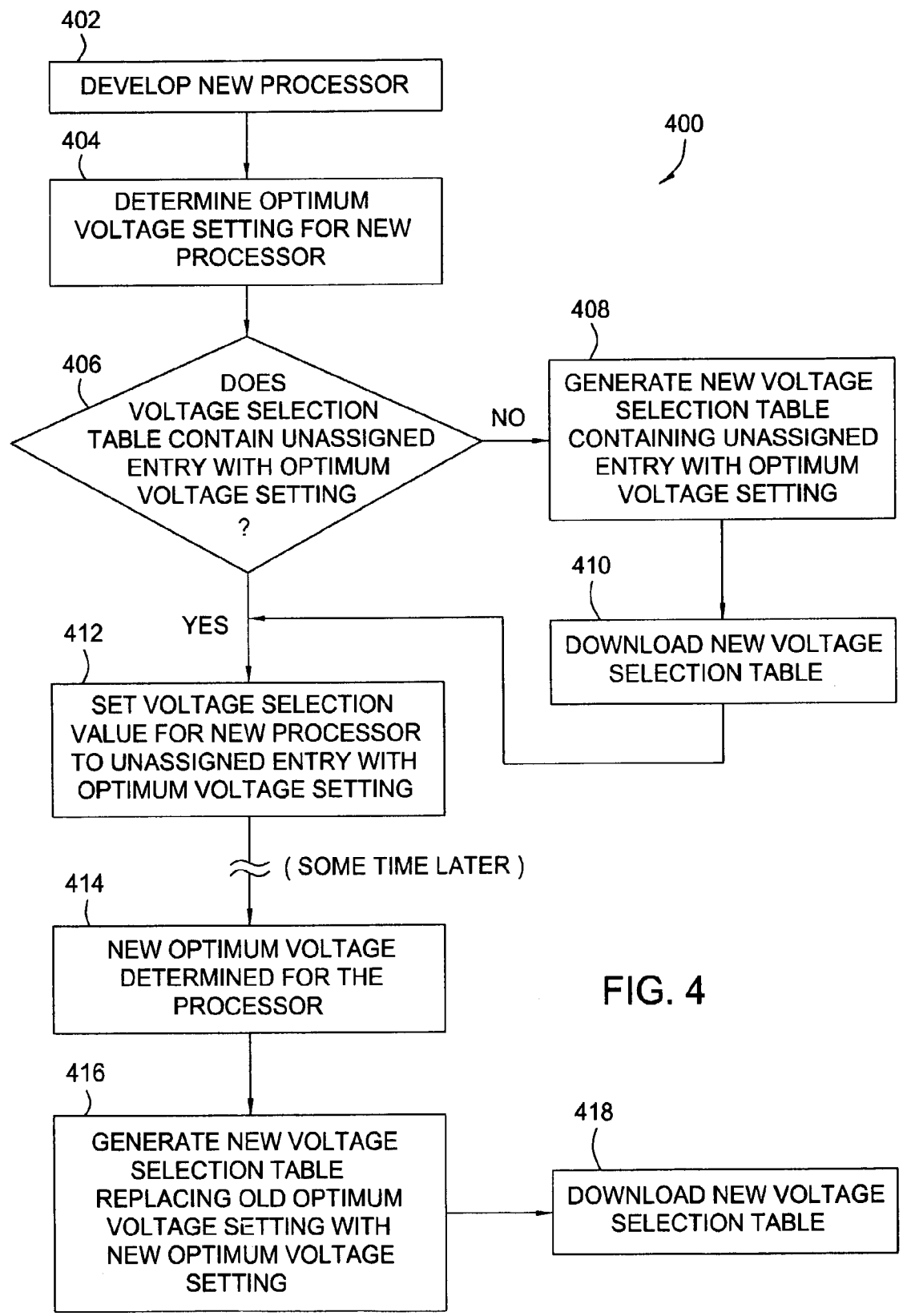
FIG. 4 is a flow chart illustrating exemplary operations for establishing a supply voltage to a component in accordance with an embodiment of the present invention.

As previously described, for some embodiments, each entry 134 in the voltage selection table 132 may be assigned to a different type of processor 110 by setting the VSV 112 of each different type (model, version, and so forth) of processor 110 to a unique value. Thus, changes in supply voltage to a processor 110 may be accomplished via download of a new voltage selection table 132 without requiring a potentially costly hardware revision. FIG. 4 illustrates exemplary operations 400 that may be performed in the life cycle of a new processor 110 to allow for initial assignment of a supply voltage, as well as future revisions, without hardware revisions.

The operations 400 begin at step 402, by developing a new processor 110 and, at step 404, an initial optimum voltage setting for the new processor 110 is determined. As previously described, however, due to expedited design cycles, there may not be time for sufficient experimentation to determine the optimum voltage setting. For example, this initial optimum voltage setting may be determined based on the optimum voltage setting for a previous version of a similar processor 110 (thought to have similar operating characteristics). Regardless how this initial optimum voltage setting is determined, as described below, the optimum voltage setting may be changed at a later time.

At step 406, a determination is made as to whether the voltage selection table 132 contains an unassigned entry 134 with the initial optimum voltage setting. If not, at step 408, a new voltage selection table containing the optimum voltage setting in an unassigned entry 134 is generated. At step 410, the new voltage selection table is downloaded, using any suitable means, such as a hardware management console (not shown) connected to the computer system 100 of FIG. 1.

At step 412, the VSV 112 for the new processor is set to a value that points to the (previously unassigned) entry 134 with the initial optimum voltage setting. If it is determined, at step 406, that the voltage selection table 132 already contains an unassigned entry 134 with the initial optimum voltage setting, the VSV 112 may be assigned to that entry 134 (without performing the operations 408 and 410). For some embodiments, in an effort to avoid operations 408 and 410 when possible, the voltage selection table 132 may be initially populated with a wide range of voltage settings thought likely to be assigned to processors 110. Of course, since different versions of processors 110 may operate at the same optimum voltage setting, the voltage selection table 132 may include multiple entries 134 with the same voltage setting.

Regardless, some time later, for example, after the new processor 110 has been released, a new optimum voltage may be determined for the processor, at step 414. For example, extensive testing may have been performed on the processor 110 to determine a supply voltage resulting in the best performance (e.g., considering various parameters, such as reliability and power consumption). A change in supply voltage to this newly determined supply voltage may be accomplished via a change to the voltage selection table 132.

Therefore, at step 416, a new voltage selection table 132 is generated, replacing the old optimum supply voltage setting with the newly determined optimum supply voltage setting in the entry 134 assigned to the processor 110. At step 418, the new voltage selection table is downloaded. For other embodiments, rather than generate and download a new voltage selection table 132, the SPCN 131 may be configured to replace the entry 134 assigned to the processor 110 containing the old optimum supply voltage setting with the new optimum supply voltage setting, for example, in response to receiving a command from an interface, such as a hardware management console.

In either case, when setting the supply voltage for the processor 110 in the future (e.g., by the SPCN 131 via the operations 300), the new optimum supply voltage setting will be retrieved from the voltage selection table 132. The newly generated voltage selection table 132 may be used replace voltage selection tables 132 in existing computer systems (e.g., as part of a firmware updates). In addition, the newly generated voltage selection table 132 may be included as firmware supplied with new computer systems or motherboards, in an effort to ensure processors included therein are operated at the most current optimum supply voltage.

CONCLUSION

Embodiments of the present invention provide methods, apparatus, and systems that result in flexible assignment and revision of supply voltages to electronic components, such as processors. For some embodiments, firmware code may read a voltage selection value embedded in a processor and configure a power supply to provide a supply voltage to the processor based on the voltage selection value. The voltage selection value may expressly indicate a supply voltage (e.g., by specifying a voltage or a DAC setting to achieve a specified voltage) or may indicate the location of an entry in a voltage selection table containing a value used to achieve a specified voltage setting. In the latter case, the supply voltage provided to the processor may be changed by downloading a new voltage selection table, thus avoiding potentially expensive hardware revisions to power supply components or the processor.

While the foregoing is directed to embodiments of the present invention, other and further embodiments of the invention may be devised without departing from the basic scope thereof, and the scope thereof is determined by the claims that follow.

What is claimed is:

1. A method comprising:
    determining an initial supply voltage for a processor;
    setting a voltage selection value of the processor to point to an entry in a voltage selection table, the entry containing a value that may be used to configure a power supply to provide the initial supply voltage to the processor;
    prior to setting the voltage selection value of the processor, determining if an existing voltage selection table contains an entry that may be used to configure the power supply to provide the initial supply voltage to the processor; and
    if not, generating the voltage selection table containing the entry that may be used to configure the power supply to provide the initial supply voltage to the processor.

2. The method of claim 1, further comprising downloading the generated voltage selection table to a computer system.

3. A method, comprising:
    determining an initial supply voltage for a processor;
    setting a voltage selection value of the processor to point to an entry in a voltage selection table, the entry containing a value that may be used to configure a power supply to provide the initial supply voltage to the processor;
    determining a new supply voltage for the processor different than the initial supply voltage; and
    generating a new voltage selection table containing an entry, pointed to by the voltage selection value, that may be used to configure the power supply to provide the new supply voltage to the processor.

4. The method of claim 3, further comprising downloading the new voltage selection table to a computer system.

* * * * *

UNITED STATES PATENT AND TRADEMARK OFFICE
CERTIFICATE OF CORRECTION

| | | |
|---|---|---|
| PATENT NO. | : 7,149,905 B2 | Page 1 of 1 |
| APPLICATION NO. | : 10/444011 | |
| DATED | : December 12, 2006 | |
| INVENTOR(S) | : Martha A. Brown, Todd J. Rosedahl and John N. Tietjen | |

It is certified that error appears in the above-identified patent and that said Letters Patent is hereby corrected as shown below:

Title page, item (75), inventor "Rosedah" shuld be --Rosedahl--.

Signed and Sealed this

Sixth Day of March, 2007

JON W. DUDAS
*Director of the United States Patent and Trademark Office*